(12) United States Patent
Brice et al.

(10) Patent No.: US 7,837,086 B2
(45) Date of Patent: Nov. 23, 2010

(54) SYSTEM, METHOD, AND APPARATUS FOR FORMING BALLISTIC ARMOR FROM CERAMIC AND SHAPE MEMORY METALLIC ALLOY MATERIALS

(75) Inventors: Craig A. Brice, Keller, TX (US); Brian T. Rosenberger, Aledo, TX (US); Slade H. Gardner, Fort Worth, TX (US); Nathan L. Weber, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 987 days.

(21) Appl. No.: 11/621,176

(22) Filed: Jan. 9, 2007

(65) Prior Publication Data

US 2010/0269975 A1    Oct. 28, 2010

(51) Int. Cl.
*B23K 31/02* (2006.01)
(52) U.S. Cl. ............... 228/164; 228/107; 89/36.02; 89/907
(58) Field of Classification Search ............ 228/107, 228/164; 89/36.02, 907
See application file for complete search history.

(56) References Cited

U.S. PATENT DOCUMENTS 5,251,803 A * 10/1993 Kashiba et al. .......... 228/124.5

FOREIGN PATENT DOCUMENTS

DE    4031550 A  *  4/1992
JP    60158546 A  *  8/1985

OTHER PUBLICATIONS

Machine Translation of DE4031550 published Apr. 1992, accessed online Mar. 2010.*

* cited by examiner

*Primary Examiner*—Jessica L Ward
*Assistant Examiner*—Nicholas P D'Aniello
(74) *Attorney, Agent, or Firm*—Bracewell & Giuliani LLP

(57) ABSTRACT

A ballistic armor uses shape memory alloys and novel joining techniques to form a solution from a combination of shape memory metallic alloys (SMA) and ceramic materials. The SMA allows a high amount of strain to be recovered through a low temperature heat treatment. The amount of strain recoverable is much higher than that available through conventional thermal expansion mismatch solutions. Solid state or low temperature bonding methods are used to join the dissimilar materials. This joining technique avoids introducing excessive heat that would cause the SMA to transform before the armor system is assembled.

13 Claims, 2 Drawing Sheets

SYSTEM, METHOD, AND APPARATUS FOR FORMING BALLISTIC ARMOR FROM CERAMIC AND SHAPE MEMORY METALLIC ALLOY MATERIALS

BACKGROUND OF THE INVENTION

1. Technical Field

The present invention relates in general to multi-layered armor materials and, in particular, to an improved system, method, and apparatus for forming ballistic armor formed from dissimilar materials such as ceramics and shape memory metallic alloys.

2. Description of the Related Art

In the prior art, there are numerous types of ballistic armor used to defend targets. Metals and metallic alloys are the most common materials used to fabricate armor, but other materials such as plastics, woven materials, and ceramics also have been used. Multi-layered armors formed from dissimilar materials (e.g., a ceramic strike plate on a metallic base) are also known and suitable for some applications. Ceramic materials are very strong in compression, but weak in tension. They are also very brittle, but can have significant strength after fracture when under compression. They also tend to be lightweight when compared to other materials such as metals. These characteristics make ceramics well suited for armor applications, but also make them very complex and difficult to understand.

When ceramic armor is impacted by a projectile, one of its primary failure mechanisms is through propagation of an acoustic wave to the back surface of the ceramic strike plate. The acoustic wave reflects off the interface and puts the back face of the ceramic material in tension. As described above, ceramic materials respond poorly to tensile loads such that the ceramic strike plate fails due to cracking that originates at the back face of the strike plate.

One solution to this problem puts the back face of the ceramic strike plate in residual compression in order to increase the amount of load that the strike plate can withstand before failure begins. One design uses the coefficient of thermal expansion (CTE) mismatch between the ceramic and metallic materials. Since metals thermally expand much more readily than ceramic materials, the entire armor system may be heated to elevated temperature (e.g., >500° C. such that the dissimilar materials are bonded together at the elevated temperature before being cooled to form the bonded product. Upon cooling, the metal shrinks more than the ceramic but is constrained by the bond between them so that the ceramic receives residual compressive stresses at its interfacing surface with the metal. Unfortunately, the amount of strain recoverable (approximately 0.3%) also is limited by thermal expansion/contraction considerations. In addition, this method requires difficult assembly procedures in high temperature furnaces with complex tooling requirements. Thus, an improved solution for joining dissimilar materials for ballistic armor applications would be desirable.

SUMMARY OF THE INVENTION

One embodiment of a system, method, and apparatus for forming ballistic armor from dissimilar materials is disclosed. The invention utilizes shape memory alloys, also known as SMA, such as nitinol. Solid state and/or low heat input technologies also are used to join the shape memory materials to one or both faces of the ceramic strike plate. The SMAs are deformed and then recover up to about 8% of plastic strain through a simple heat treatment. For example, an SMA product is subjected to a designated plastic strain level, bonded to the back side of a ceramic armor plate, and then heat treated to completely recover the strain in the SMA. This sequence of operational steps puts the surface of the ceramic that interfaces with the SMA in residual compression.

In one application, the SMA is strained to its limit, and an interface material is solid state bonded to the SMA. A reactive, bimetallic brazing technique joins the interlayer material to the ceramic with a high temperature over a ver short period of time (e.g., milliseconds). This solution allows the braze to melt but prevents the base materials from experiencing significant thermal conditions. As a result, the entire process is simplified since the brazing is not done at elevated temperatures. After the product is assembled, the system is exposed to a low temperature heat treatment to recover the strain and leave the ceramic material in residual compression. The invention is a much more controllable, tailorable, and higher performance system that eliminates the need for complex assemblies in high temperature furnaces.

In summary, the invention uses shape memory alloys and novel joining techniques to form a complete ballistic armor design. The SMA allows a high amount of strain to be recovered through the low temperature heat treatment. The amount of strain recoverable is much higher than that available through conventional CTE mismatch solutions. The invention uses solid state and/or low temperature bonding methods to join the dissimilar materials. Typical SMAs transform and recover strain at low temperature and may be tailored in the 100° C. range. This joining technique avoids introducing excessive heat that would cause the SMA to transform before the armor system is assembled.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
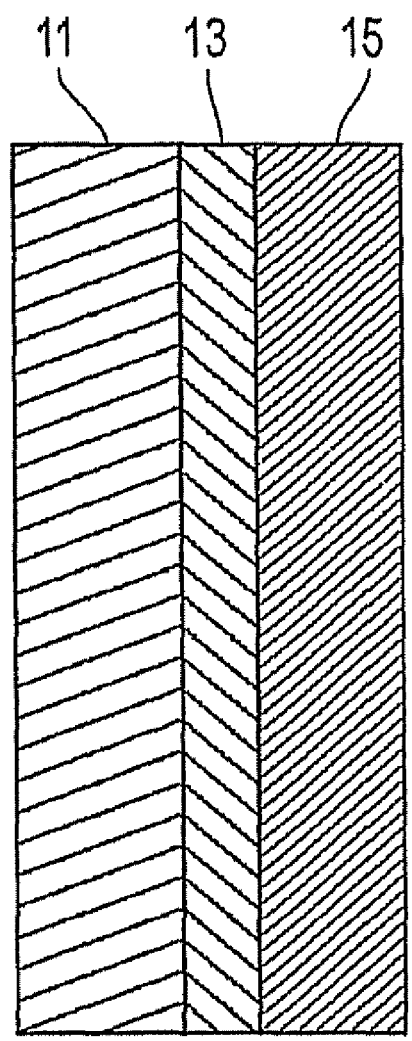
FIG. 1 is a schematic sectional side view of one embodiment of armor constructed in accordance with the present invention.
Figure 2:
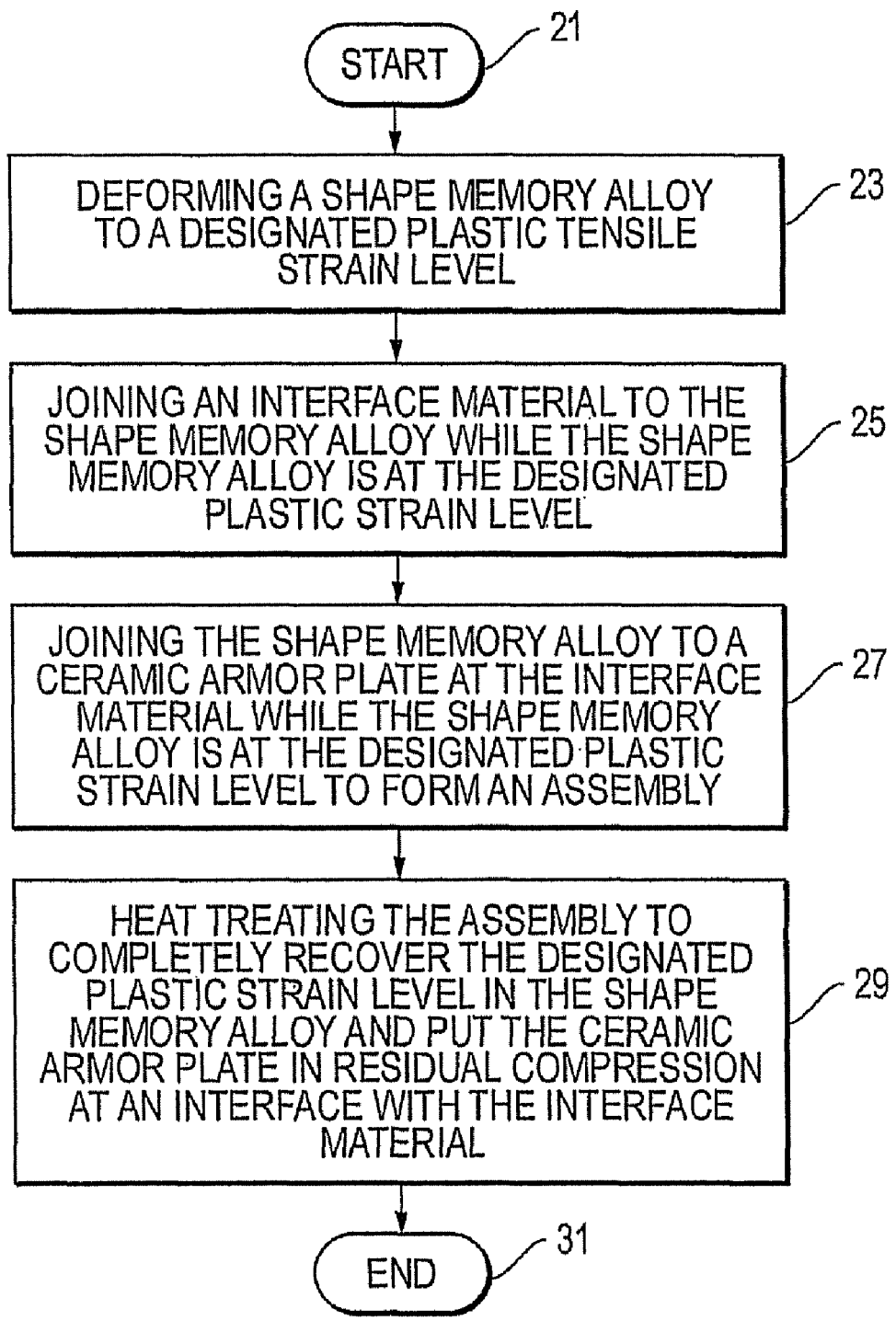
FIG. 2 is a high level flow diagram of one embodiment of a method in accordance with the invention.

Referring to FIGS. 1 and 2, embodiments of a system, method, and apparatus for a ballistic armor system are shown. As shown in FIG. 1, the ballistic armor system 10 may comprise a shape memory alloy 11, an interface material 13 mounted to the shape memory alloy 11, and a ceramic plate (e.g., an armor strike plate) 15 mounted to the interface material 13 opposite the shape memory alloy 11. The shape memory alloy may be joined to one or both faces of the ceramic plate via this technique. In order to improve its performance, the ceramic armor strike plate 15 is in residual compression at an interface with the interface material 13.

In one embodiment, the shape memory alloy 11 comprises nitinol (i.e., Nickel Titanium Naval Ordnance Laboratories), and the ceramic armor strike plate is in up to approximately 8% residual compression. Other shape memory alloys also may be used. The interface material 13 may be solid state bonded to the shape memory alloy 11 via, e.g., explosive bonding, ultrasonic bonding, etc. The interface material may comprise a form such as thin sheet, ribbon, wires, etc., and may be formed from a material such as titanium or aluminum.

In one embodiment, the interface material is reactive bimetallic brazed to the ceramic armor strike plate (e.g., utilizing NANOFOIL® by Reactive NanoTechnologies). The interface material helps transfer the strain from the shape memory alloy to the ceramic. Without the interface material, there would be a stepwise change in strain; the ductile interface material helps provide a transition gradient. In addition, the reactive braze material attains a high temperature, even if for a brief period of time. The interface material absorbs the heat generated and keeps the shape memory alloy from getting hot and transforming.

As shown in FIG. 2, one embodiment of a method of forming ballistic armor is shown. The method begins as indicated at step 21 and comprises deforming a shape memory alloy to a designated plastic tensile strain level (step 23); joining an interface material to the shape memory alloy while the shape memory alloy is at the designated plastic strain level (step 25); joining the shape memory alloy to one or more faces of a ceramic armor plate at the interface material while the shape memory alloy is at the designated plastic strain level to form an assembly (step 27); heat treating the assembly to completely recover the designated plastic strain level in the shape memory alloy and put the ceramic armor plate in residual compression at an interface with the interface material (step 29); before ending as indicated at step 31.

The method also may comprise deforming the shape memory alloy to the designated plastic tensile strain level of up to approximately 8% tension, and putting the ceramic armor plate in up to approximately 8% residual compression. The method may further comprise solid state bonding the interface material to the shape memory alloy with a bonding method selected from the group consisting of explosive, ultrasonic, magnetic pulse, etc. In addition, the method may comprise using a reactive, bimetallic brazing technique to join the interface material to the ceramic armor plate with a high temperature over milliseconds, such that a braze melts but the shape memory alloy is not affected by the high temperature. In another embodiment, the method comprises a low temperature heat treatment of approximately 100° C. to recover the designated plastic tensile strain level in the shape memory alloy and leave the ceramic armor plate in proportional residual compression.

In a more simplified version, one embodiment of the method comprises forming armor by deforming a shape memory alloy to a designated plastic strain level; joining an interface material to the shape memory alloy; joining the shape memory alloy to a ceramic armor plate at the interface material to form an assembly; and heat treating the assembly to recover the designated plastic strain level in the shape memory alloy and put the ceramic armor plate in residual strain.

While the invention has been shown or described in only some of its forms, it should be apparent to those skilled in the art that it is not so limited, but is susceptible to various changes without departing from the scope of the invention.

What is claimed is:

1. A method of forming armor, comprising:
   (a) deforming a shape memory alloy to a designated plastic strain level;
   (b) joining an interface material to the shape memory alloy;
   (c) joining the shape memory alloy to a ceramic armor plate at the interface material to form an assembly; and
   (d) heat treating the assembly to recover the designated plastic strain level in the shape memory alloy and put the ceramic armor plate in residual strain.

2. A method according to claim 1, wherein step (a) comprises deforming the shape memory alloy to the designated plastic strain level of up to approximately 8% tension, and step (d) comprises putting the ceramic armor plate in up to approximately 8% residual compression.

3. A method according to claim 1, wherein the shape memory alloy is nitinol, and step (c) comprises joining the shape memory alloy to more than one face of the ceramic armor plate.

4. A method according to claim 1, wherein step (b) comprises solid state bonding the interface material to the shape memory alloy.

5. A method according to claim 4, wherein the solid state bonding is selected from the group consisting of explosive and ultrasonic bonding.

6. A method according to claim 1, wherein the interface material is selected from the group consisting of thin sheet, ribbon, and wires.

7. A method according to claim 1, wherein the interface material is selected from the group consisting of titanium and aluminum.

8. A method according to claim 1, wherein step (d) comprises a low temperature heat treatment of approximately 100° C. to completely recover the designated plastic strain level in the shape memory alloy and leave the ceramic armor plate in proportional residual compression.

9. A method of forming ballistic armor, comprising:
   (a) deforming a shape memory alloy to a designated plastic tensile strain level;
   (b) joining an interface material to the shape memory alloy while the shape memory alloy is at the designated plastic strain level;
   (c) joining the shape memory alloy to a ceramic armor plate at the interface material while the shape memory alloy is at the designated plastic strain level to form an assembly; and
   (d) heat treating the assembly to completely recover the designated plastic strain level in the shape memory alloy and put the ceramic armor plate in residual compression at an interface with the interface material.

10. A method according to claim 9, wherein:
    the shape memory alloy is nitinol;
    step (a) comprises deforming the shape memory alloy to the designated plastic tensile strain level of up to approximately 8% tension; and
    step (d) comprises putting the ceramic armor plate in up to approximately 8% residual compression.

11. A method according to claim 9, wherein step (b) comprises solid state bonding the interface material to the shape memory alloy with a method selected from the group consisting of explosive and ultrasonic bonding, and step (c) comprises joining the shape memory alloy to more than one face of the ceramic armor plate.

12. A method according to claim 9, wherein the interface material is in a form selected from the group consisting of thin sheet, ribbon, and wires, and is formed from a material selected from the group consisting of titanium and aluminum.

13. A method according to claim 9, wherein step (d) comprises a low temperature heat treatment of approximately 100° C. to recover the designated plastic tensile strain level in the shape memory alloy and leave the ceramic armor plate in proportional residual compression.

* * * * *